June 16, 1925. 1,541,882
C. W. WEISS
TRANSMISSION DEVICE
Filed May 31, 1922 4 Sheets-Sheet 1
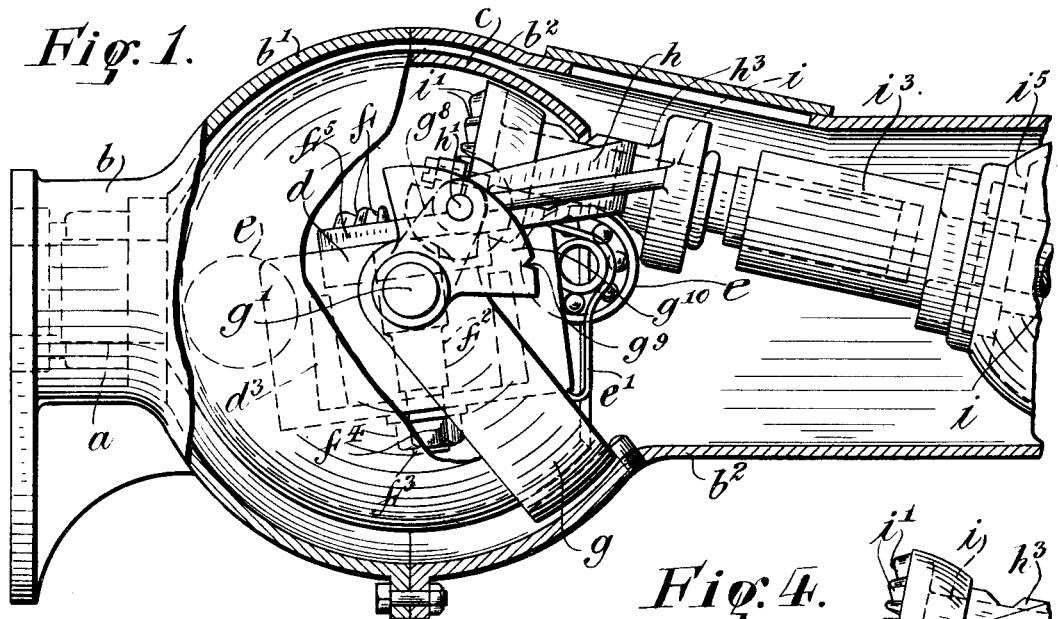
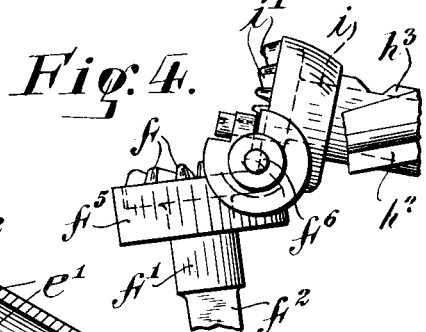
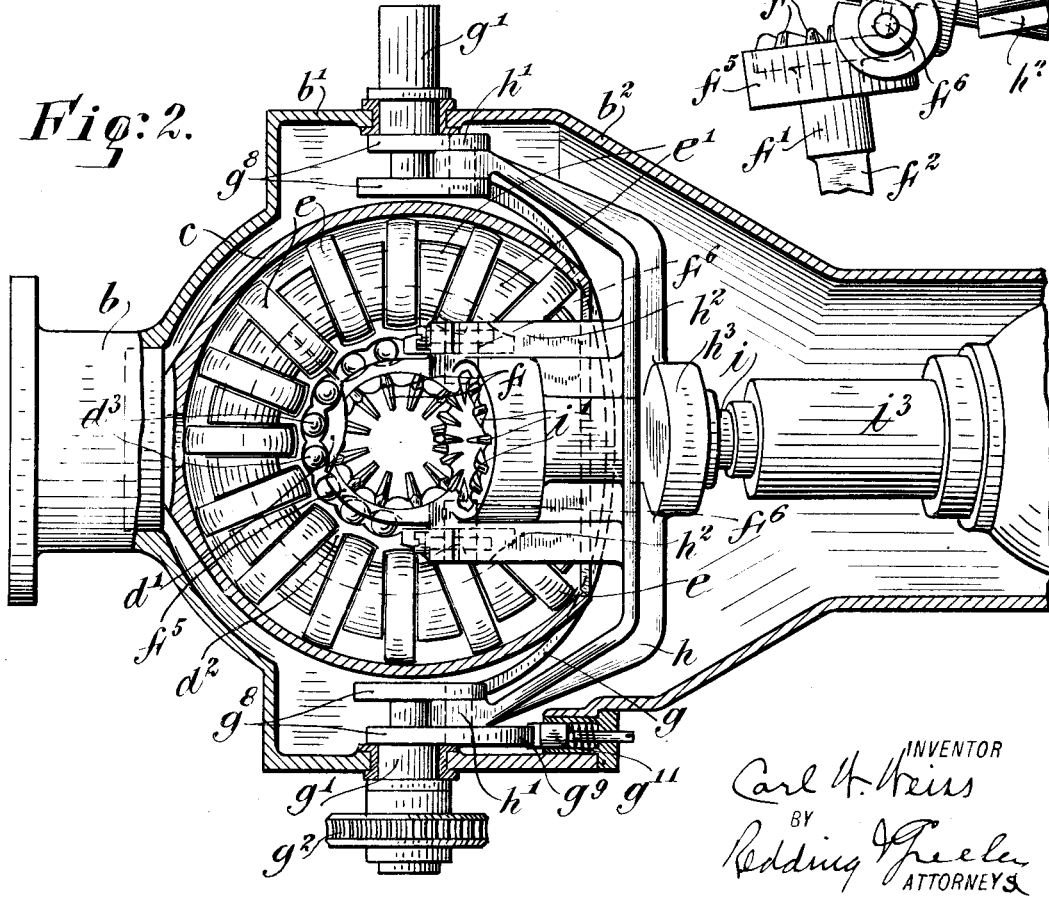

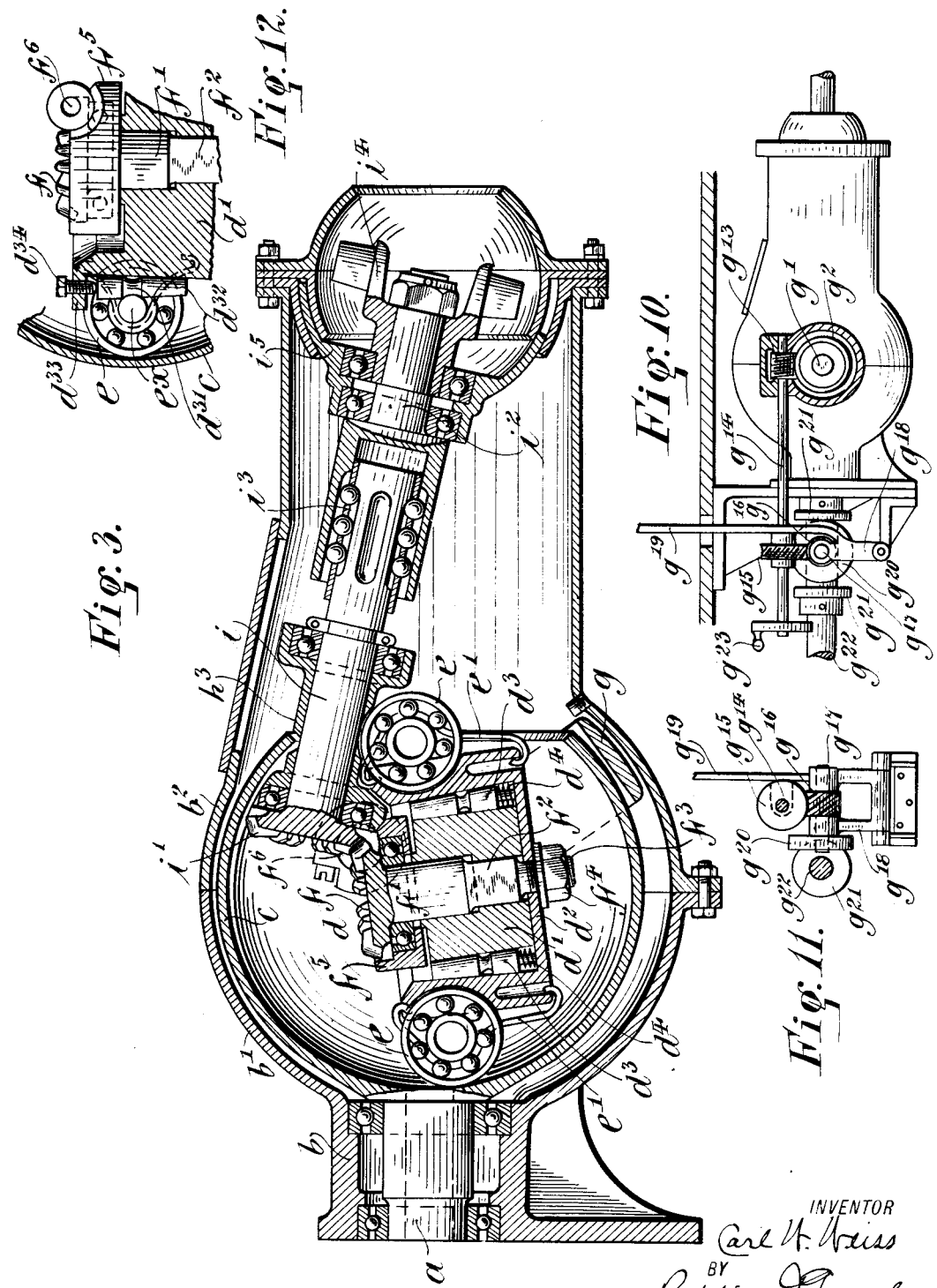

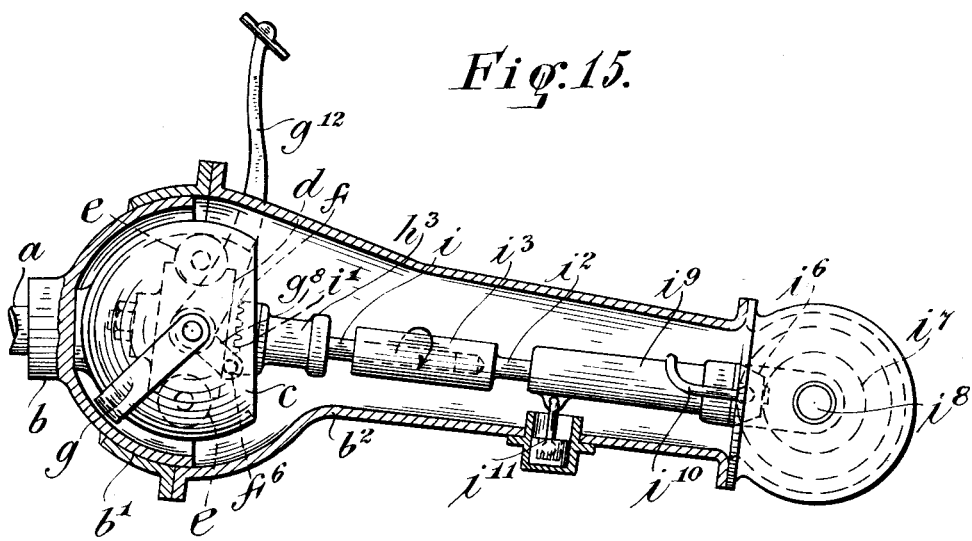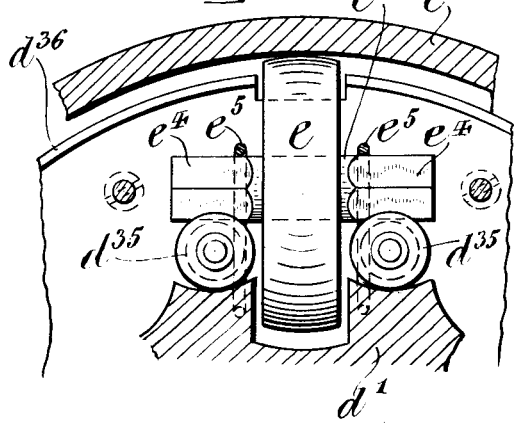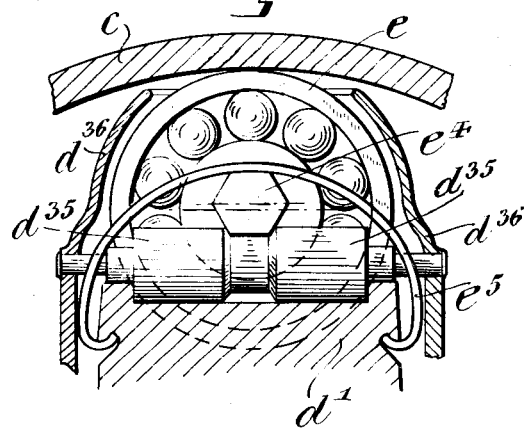

Patented June 16, 1925.

1,541,882

UNITED STATES PATENT OFFICE.

CARL W. WEISS, OF BROOKLYN, NEW YORK, ASSIGNOR OF ONE-HALF TO CLARENCE B. STURGES, OF FAIRFIELD, CONNECTICUT.

TRANSMISSION DEVICE.

Application filed May 31, 1922. Serial No. 564,700.

*To all whom it may concern:*

Be it known that I, CARL W. WEISS, a citizen of the United States, whose residence is 933 East 12th Street, in the borough of Brooklyn of the city of New York, in the State of New York, have invented certain new and useful Improvements in Transmission Devices, of which the following is a specification, reference being had to the accompanying drawing, forming a part hereof.

This invention relates to power transmission devices of the general character of that shown in Letters Patent of the United States No. 1,141,508, dated June 1, 1915 and No. 1,146.982 dated July 20, 1915 and comprising a rotatable mutor and a co-operating body concentric therewith, one of said parts having a spherical bearing surface and the other having gripping elements to co-operate with such bearing surface, with means to vary the relative angular axial position of said parts and thereby to vary the speed ratio of said parts and therefore of the driving element and the driven element. One object of the invention is to provide a torque governor, whereby, in transmission devices of the same or of generally similar character, that is in which two co-acting elements sustain a variable speed ratio, variation of the speed ratio shall be effected automatically through the variation of the torque or resistance of the driven element. A further object of the invention is to provide a practicable construction whereby, in such a transmission device, reversal of movement can be effected also at variable speed within a reasonable limit. Provision is also made whereby adjustment of the gripping elements can be effected for the purpose of compensating for wear. Other features of improvement will be more fully described hereinafter with reference to the accompanying drawings in which the invention is illustrated as embodied in suitable form, together with some modifications, and in which—

Figure 1 is a view of the improved transmission device mainly in side elevation, a portion of the spherical bearing member and a portion of the housing being shown in section, the torque governor being omitted in order to avoid confusion.

Figure 2 is a top view of the parts shown in Figure 1, with the spherical member and the housing in horizontal section.

Figure 3 is a view of the same in longitudinal section in a vertical plane.

Figure 4 is a detail view of a portion of the mechanism shown in Figures 1, 2 and 3.

Figures 10 and 11 are detail views of power operated but hand regulated controlling devices for the transmission.

Figure 12 is a detail view illustrating one form of adjusting means for the gripping elements.

Figures 13 and 14 are detail views, on a larger scale, illustrating another form of adjusting device for the gripping elements, with means for spacing the supporting rollers.

Figure 15 is a view in side elevation, with the housing in section, on a smaller scale than that of Figure 3, illustrating a different form of controlling devices and one form of torque governor.

Figure 5:
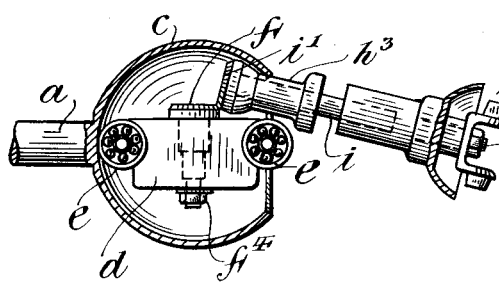
Figures 5, 6 and 7 are partial views, partly diagrammatic, somewhat similar to Figure 3 but on a smaller scale and with the driven members in elevation, illustrating the three different positions of the driven elements which they occupy respectively when the transmission is zero, when the transmission is above zero but slow, and when the transmission is direct or at full speed ahead.
Figure 6:
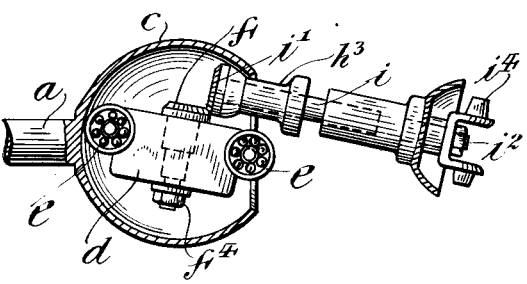
Figure 7:
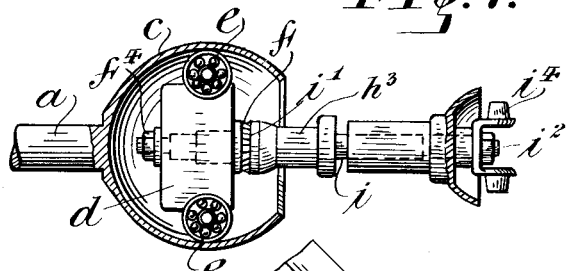

The mechanisms illustrated in the drawings have been designed with special reference to the use in connection with transmission devices of the character referred to, but it will be understood that they are capable of use in connection with other devices in which one member sustains a variable speed ratio with respect to another. In the embodiment of the invention illustrated particularly in Figures 1 to 7, the driving part or shaft $a$ is shown as mounted for rotation in suitable bearings carried by a sleeve $b$, which is formed with one member of a two-part housing $b'$ $b^2$. The driving shaft $a$ has formed therewith or suitably secured thereto an internally spherical driving member $c$ which, for the purpose of permitting the motion to be reversed, is more than hemispherical, but has, opposite the shaft $a$, an opening of sufficient diameter to permit the introduction of the co-acting, driven member or mutor which has, with respect to the driving member, a variable, angular axial position.

In Figures 1 to 7 of the drawings, the mutor $d$ comprises a rotatable two-part carrier $d'$ $d^2$ which is armed with gripping members $e$ for driving engagement with the driving member $c$, is supported so that its angular axial position with respect to the driving member can be varied, and is provided with a gear $f$ through which its rotation upon its own axis is transmitted to the axle or other part to be driven at a variable speed. The spindle $f'$ of the gear $f$ is mounted for rotation in a bearing $f^5$ which is supported as hereinafter described so as to permit the angular axial position of the mutor to be varied. A portion of the spindle $f'$ is squared, as at $f^2$, to engage one part $d'$ of the carrier $d'$ $d^2$, and is also threaded, as at $f^3$, to receive a nut $f^4$ so that the spindle and both parts $d'$ and $d^2$ of the carrier may be secured together and to the gear $f$ to rotate therewith. The part $d'$ of the carrier is received within the cup-like part $d^2$ of the carrier, the proximate faces of the parts $d'$ and $d^2$ being scalloped, as shown in Figure 2, and spaced so as to receive between them tapered rollers $d^3$ which may be subject each to the pressure of a spring $d^4$. The gripping members $e$ consist of rollers which are mounted upon the carrier, through suitable bearings, so as to rotate freely in radial planes, the rollers and their bearings being held to the carrier by spring clips $e'$. It is necessary that the rollers or gripping elements $e$ be held in frictional contact with the surface of the spherical driving member $c$ and this purpose the tapered rollers $d^3$, urged by the springs $d^4$ and co-acting with the scalloped proximate surfaces of the parts $d'$ and $d^2$ of the carrier, accomplish, the cup-like part $d^2$ of the carrier yielding sufficiently to permit the rollers $e$ to be pressed always, in the operation of the mechanism, against the bearing surface of the spherical driving member $c$. There will be described hereinafter devices whereby adjustment of the gripping elements can be effected in order to permit compensation for wear, but illustration of such devices has been omitted from Figures 1, 2 and 3 in order to avoid confusion.

Figure 8:
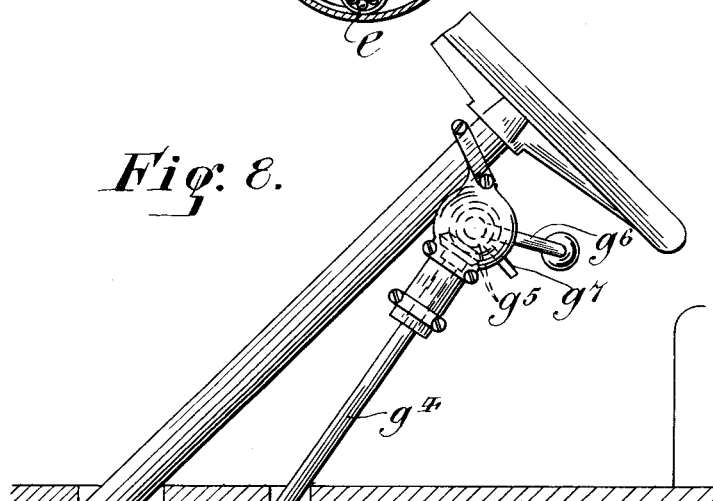
Figures 8 and 9 are detail views of hand-operated controlling devices for the transmission.
Figure 9:
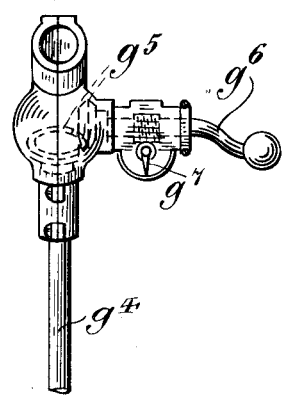

In order that the relative angular axial position of the mutor with respect to the coacting member may be varied to secure different speed ratios, the mutor is supported by a main frame $g$, so that its angular position with respect to the co-acting member can be varied about an axis which passes through the center of the spherical bearing surface, and in order that the relative angular axial position may be varied through more than 90°, so as to permit a reversal of direction of movement, while at the same time it is possible to use a sufficient body of metal for practical operation, the mutor is supported by the main frame through the intermediary of a secondary frame $h$ which is hinged upon the main frame on an axis which is tangent to the pitch circle of the gear $f$ above mentioned. The main frame $g$ has trunnions $g'$ which are mounted in the housing $b'$, $b^2$, the axis of the trunnions passing through the center of the spherical member $c$. The force to vary the position of the frame $h$ and therefore of the mutor may be applied through one of the trunnions. As shown in Figures 2 and 8, one of the trunnions has secured thereto a worm wheel $g^2$, which may be engaged by a worm $g^3$ on a shaft $g^4$, operated through beveled gears $g^5$ by a crank $g^6$, which may be provided with an indicator, as at $g^7$. For the support of the secondary frame $h$ each trunnion is provided with arms $g^8$, to which the frame $h$ is hinged, as at $h'$; one of the arms is extended as a segment $g^9$, as shown in Figure 1, and is notched as at $g^{10}$, for co-operation with a spring pressed, slipping detent $g^{11}$, shown in Figure 2, for the purpose of affording a convenient means of steadying the mutor in the zero position, that is, the position in which no movement is transmitted from the spherical member to the mutor. The detent does not create sufficient resistance to prevent the movement of the mutor from the ero position by the means employed to vary its position.

The secondary frame $h$ has arms $h^2$ which receive in suitable bearings at their ends, studs $f^6$ which project from the bearing $f^5$, the axis of the studs being tangential to the pitch circle of the gear $f$.

The secondary frame $h$ also has a bearing $h^3$ for the transmission shaft $i$ which bears a gear $i'$ in mesh with the gear $f$ of the mutor. The shaft $i$ is shown in Figure 3 as connected with an aligned shaft $i^2$ by a slip joint $i^3$, so as to permit movement of the gear $i'$ with the gear $f$ as the position of the mutor is varied, and the shaft $i^2$ is shown as provided with a connection $i^4$ which forms part of a universal joint, and as supported by a spherical bearing $i^5$ which permits the swinging movement of the transmission shaft $i$, $i^2$ as the position of the mutor is varied.

It will now be understood that the rigid connection of the two trunnions $g'$, $g'$ by the frame $g$ is necessary to maintain in exact alignment the axes of the two ends of the secondary frame $h$ on which the secondary frame is hinged to the arms $g^8$ of the trunnions. It will also be seen that as the relative angular axial position of the frame $g$, with the trunnions $g'$ and arms $g^8$ is varied, the relative angular position of the secondary frame $h$ is also varied and that since the frame $h$ supports through the bearing $f^5$ and the spindle $f'$ the carrier $d'$, $d^2$, the relative angular position of the mutor, comprising the spindle $f'$, the carrier $d'$, $d^2$ and the gripping elements $e$ will also be varied, while through the connection of the frame $h$ and the transmision shaft, which has at its remote end a spherical bearing and thereby controls the movement of the mutor, the gears $f$ and $i'$ will be maintained in mesh and that the speed ratio between the driving shaft $a$ and the driven part, represented by the transmission shaft $i$, $i^2$, will depend upon the angular position of the mutor with respect to the spherical driving member. In the position of the parts represented in Figure 5 no movement will be transmitted. In the position of the parts represented in Figure 6 slow movement will be transmitted. In the position of the parts represented in Figure 7 the maximum movement will be transmitted, the speed ratio being then 1:1. It will be obvious that the varying of the angular relation of the mutor and its coacting element can be effected by different means, as the conditions of use may render desirable. In Figure 8 of the drawings are shown means, already described, by which the automobile driver can use his hands to vary the position of the mutor. In Figure 15 a pedal $g^{12}$ is shown as applied to one of the trunnions of the main frame $g$, so that the pressure of the driver's foot can be applied to vary the position of the mutor, this device being shown in conjunction with automatic means, to be described hereinafter. whereby the speed ratio between the driving member and the driven member is subject to the torque or the resistance of the driven part. In Figures 10 and 11 are shown devices whereby the power of a motor, as of an automobile, is applied, under the control of the driver, to vary the position of the mutor. In this instance the worm wheel $g^2$ on the trunnion $g'$ is shown as engaged by a worm $g^{13}$ on a shaft $g^{14}$ which carries a worm wheel $g^{15}$. The latter is engaged by a worm $g^{16}$ on a short shaft $g^{17}$ which is mounted in a hinged bracket $g^{18}$ provided with a hand lever $g^{19}$. The shaft $g^{17}$ carries a friction wheel $g^{20}$ which can be moved by the driver into engagement with one or the other of two opposite collars $g^{21}$ on the engine shaft $g^{22}$. By moving the friction wheel $g^{20}$ into engagement with one or the other of the collars $g^{21}$ the driver can cause the relative angular position of the mutor to be varied in one direction or the other. The shaft $g^{14}$ may also be provided with a hand wheel $g^{23}$ for operation, the worm and worm wheels $g^{15}$ and $g^{16}$ being so related that movement can be transmitted from either one to the other.

In order to avoid complications of the drawing, no means are shown in Figure 3 to effect adjustment of the gripping elements $e$ with respect to the spherical coacting member for the purpose of compensating for wear, but it will be desirable in many cases to provide for such adjustment. One device adapted for this purpose is shown in Figure 12, in which the shaft $e^x$ of each roller $e$ is shown as supported directly in the grooves $d^{31}$ of two adjacent tapered rollers $d^{32}$, seated in the adjacent scallops of the block $d'$. The block $d'$ is shown as having a flange $d^{33}$ which overlies the rollers $d^{32}$ and carries in line with each roller a set screw $d^{34}$. By setting up on the set screws $d^{34}$ each roller $e$ can therefore be pressed away from the axis of the carrier and more tightly against the spherical bearing surface. In the construction shown in Figures 13 and 14 the shaft $e^3$ of each roller $e$ is shown as having eccentric hexagonal ends $e^4$ which rest on suitably grooved rollers $d^{35}$. By rotating the shaft $e^4$ the roller $e$ can be held further from the axis of the mutor and pressed more closely against the spherical co-operating member $c$. The rollers $e$ are shown as held to position against the carrier $d'$ by spring clips $e^5$ and the rollers $d^{35}$ are shown as held in spaced relation by annular retainers $d^{36}$ which engage the reduced ends of the rollers. All of the rollers are thus held in the same relation to the respective scallops in which they stand.

It is very desirable in some uses to which the improved transmission may be applied to provide means whereby the transmission device shall be automatically responsive to variations in torque or resistance. This is particularly desirable in automobile equipment, so that the car can be driven on the throttle alone, the speed ratio of the transmission device being varied so that the speed ratio shall be increased automatically as the resistance to the movement of the car increases, as in ascending a grade. One form of such torque governor is illustrated in Figure 15. as applied in conjunction with the transmission device illustrated in detail in Figures 1 to 7 and heretofore described.

In this figure the mutor $d$, shown in broken lines within the spherical member $c$, is represented as in the position for direct drive, the speed ratio being about 1:1. The bearing $h^3$, which supports the transmission shaft $i$, is hinged at $f^6$ to the bearing which supports the gear $f$ of the mutor and itself supports the gear $i'$. The transmission shaft $i$, $i^2$ is provided with a slip joint $i^3$, as previously described, but the extremity of the shaft $i^2$, instead of being provided with a universal connection, carries a beveled pinion $i^6$ which engages a bevel gear $i^7$ on the driven shaft $i^8$ or, it might be, the corresponding gear of an automobile differential. The shaft member $i^2$ is carried in a sleeve $i^9$ which is hung on the axis of the shaft $i^8$, subject to the action of a spring $i^{10}$ and may also be provided with a dashpot $i^{11}$. It will be understood that whenever the torque increases, as when resistance to the rotation of the shaft $i^8$ is increased, the beveled pinion $i^6$ will have a tendency to climb on the gear $i^7$, thereby swinging the sleeve $i^9$ and the transmission shafts $i$, $i^2$ upward on the axis of the shaft $i^8$ and so, through the connection to the support of the mutor, changing the relative axial position of the mutor with respect to the spherical driving member, from the position represented in Figure 15 and in Figure 7, toward that represented in Figure 6 or in Figure 5 and consequently increasing the speed ratio between the mutor and the spherical driving member. It will be obvious that the torque may be made to react upon the transmission device through various mechanical means suited to the conditions of operation and that the transmission device is of such a character, with respect to the relations of the mutor and the spherical member, as to lend itself peculiarly to influence by the torque or resistance, requiring only a change of speed ratio and having no gears the changing ratio of which is dependent upon the slip of one part with respect to another.

The provision of annular retainers or spacers, for the rollers which support the gripping elements and co-act with the scallops or equivalent formations of the carrier, substantially as shown in Figures 13 and 14, is of considerable practical value for the reason that it assures uniform positioning of all of such rollers or bearing members with respect to the scallops and therefore uniform co-action of all of the gripping elements with the spherical surface against which they bear. Without such spacers one or another of the gripping elements might be caused to carry all or the great part of the load, whereby the power which can be transmitted would be greatly reduced as compared with the power which can be transmitted when all of the gripping elements co-act uniformly with the spherical bearing surface.

It is to be noted that in the transmission devices shown and described in the above mentioned Letters Patent No. 1,141,508, although provision was made for reversal of direction, it was accomplished only by placing a limitation on the speed of direct transmission. In other words, in the device described in said Letters Patent it was possible to give the mutor movement through 90° as a maximum, so that whatever of the annular displacement of the mutor was available for reversing, was deducted from the total, leaving less than 90° of displacement available for direct transmission whereby it was impossible to secure with a speed ratio of 1:1. In the present case, however, the spherical bearing surface having an extent of more than 180°, the mutor is capable of a displacement of more than 90° by reason of the fact that the transmission shaft is movably supported, as by the secondary frame, for example, so that the two transmission gears, of the mutor and of the transmission shaft respectively, may remain in mesh throughout the displacement of the mutor more than 90°. Consequently, in the present case, it is possible to secure direct transmission at all speeds up to and including a speed ratio of 1:1 and also to secure capacity for reversal through displacement of the mutor more than 90°.

I claim as my invention:

1. A power transmission device comprising a support, a rotating body having a spherical bearing surface supported in fixed relation to said support, a main frame supported on an axis transverse to the axis of the rotating body and capable of being rocked on said axis, a secondary frame hinged on the main frame, a second rotating mody supported by the secondary frame and having a driving engagement with said spherical bearing surface, a transmission shaft supported by the secondary frame, and co-acting gears carried by said second named rotating body and the transmission shaft respectively.

2. A power transmission device comprising a support, a rotating body having a spherical bearing surface supported in fixed relation to said support, a main frame supported on an axis transverse to the axis of the rotating body and capable of being rocked on said axis, a secondary frame hinged on the main frame, a second rotating body supported by the secondary frame, and having a driving engagement with said spherical bearing surface, a transmission shaft supported by the secondary frame, and co-acting gears carried by said second named rotating body and the transmission shaft respectively, the hinged axis of the secondary frame being tangential to the pitch circle of said gears.

3. A power transmission device comprising a support, a rotating body having a spherical bearing surface supported thereby, a frame supported on an axis transverse to the axis of the rotating body and capable of being rocked on said axis, a bearing supported by said frame, a gear and spindle supported by said bearing, a carrier mounted on said spindle to rotate therewith and forming one of the transmission elements and gripping elements mounted on said carrier and having driving engagement with said spherical bearing surface.

4. A power transmission device comprising a support, a rotating body having a spherical bearing surface supported thereby, a frame supported on an axis transverse to the axis of the rotating body and capable of being rocked on said axis, a bearing supported by said frame, a gear and spindle supported by said bearing, a carrier mounted on said spindle to rotate therewith and gripping elements mounted on said carrier and having driving engagement with said spherical bearing surface, a second bearing hinged to the first mentioned bearing, a transmission shaft supported by said bearing and a gear carried by said transmission shaft in engagement with the first mentioned gear.

5. A power transmission device comprising a support, a rotating body having a spherical bearing surface supported thereby, a frame having trunnions mounted on an axis transverse to the axis of the rotating body, arms on the trunnions, a secondary frame hinged on said arms, and a second rotating body supported by said secondary frame and having a driving engagement with said spherical bearing surface.

6. A power transmission device comprising a support, a rotating body having a spherical bearing surface supported thereby, a frame having trunnions mounted on an axis transverse to the axis of the rotating body, arms on the trunnions, a secondary frame hinged on said arms, a second rotating body supported by said secondary frame and having a driving engagement with said spherical bearing surface, a bearing also supported by said secondary frame, a transmission shaft mounted in said bearing, and co-acting gears carried by said second rotating body and said transmission shaft.

7. A power transmission device comprising a support, a rotating body having a spherical bearing surface supported thereby, a frame supported on an axis transverse to the axis of the rotating body and capable of being rocked on said axis, a rotating carrier supported by said frame and forming one of the transmission elements, gripping elements mounted on said carrier and free to rotate in radial planes, and means to adjust the pressure of the gripping elements against the rotating body.

8. A power transmission device comprising a rotating body having a spherical bearing surface and a co-acting member comprising a scalloped carrier, rollers seated in the scallops of the carrier, spacing means to maintain all of the rollers in uniform relation with respect to the scallops, and gripping elements supported by the rollers.

9. A power transmission device comprising a rotating body and having a spherical bearing surface and a co-acting member comprising a scalloped carrier, rollers seated in the scallops of the carrier, annular retainers engaging the rollers and maintaining them in uniform relation with respect to the scallops, and gripping elements supported by the rollers.

10. A power transmission device comprising a rotating body having a spherical bearing surface and a co-acting member comprising a carrier, rollers bearing on the carrier, and gripping elements having supporting shafts with eccentric polygonal ends resting on the rollers.

11. A power transmission device comprising a rotating body having a spherical bearing surface and a co-acting member comprising a carrier, rollers bearing on the carrier, gripping elements having supporting shafts with eccentric polygonal ends resting on the rollers, and spring clips engaging the carrier and the shafts of the gripping elements to hold the gripping elements and the rollers in operative relation with the carrier.

12. A power transmission device comprising a rotatable mutor, a co-operating body concentric with the mutor, one of said parts having a spherical bearing surface and the other of said parts having gripping elements to co-operate with the spherical bearing surface, means responsive to the variation of torque of that one of said co-operating parts which is the driven part, for controlling the relative angular axial positions of said parts, and driving means for one of said parts.

13. A power transmission device comprising a rotating body having a spherical bearing surface, a frame supported on an axis transverse to the axis of the rotating body and capable of being rocked on said axis, a second rotating body mounted on said frame and having a driving engagement with said spherical bearing surface, and means responsive to the variation of torque on the driven member for automatically effecting the movement of the frame upon its axis and a change in the relative positions of the rotating bodies.

14. A power transmission device comprising a casing, a rotating body having an internal spherical bearing surface of more than 180° and supported in fixed relation to the casing, a frame supported by the casing on an axis transverse to the axis of the rotating body and capable of being rocked on said axis, a mutor comprising a rotatable carrier supported by the frame, gripping elements to coact with the spherical bearing surface, and a transmitting gear, a transmission shaft having a gear in mesh with the first mentioned gear within the spherical bearing surface, and means to support the last mentioned gear movably to remain in mesh with the first mentioned gear in the movements of the same with the mutor.

15. A power transmission device comprising a casing, a rotating body having an internal spherical bearing surface of more than 180° and supported in fixed relation to the casing, a frame supported by the casing on an axis transverse to the axis of the rotating body and capable of being rocked on said axis, a mutor comprising a rotatable carrier supported by the frame, gripping elements to co-act with the spherical bearing surface, and a transmitting gear, an extensible transmission shaft having a gear in mesh with the first mentioned gear within the spherical bearing surface, and means to support the last mentioned gear movably to remain in mesh with the first mentioned gear in the movements of the same with the mutor.

16. A power transmission device comprising a rotatable mutor, a co-operating body concentric with the mutor, one of said parts having a spherical bearing surface and the other of said parts having gripping elements to co-operate with the spherical bearing surface, means to adjust the gripping elements upon their supporting part so as to adjust the pressure of the gripping elements against the spherical bearing surface, means to vary the relative angular axial position of the mutor and the spherical bearing surface, and driving means for one of said parts.

This specification signed this 11th day of May A. D. 1922.

CARL W. WEISS.